(12) United States Patent
Martin et al.

(10) Patent No.: US 8,572,435 B2
(45) Date of Patent: Oct. 29, 2013

(54) SYSTEM AND METHOD FOR CORRELATING CARRIER ETHERNET CONNECTIVITY FAULT MANAGEMENT EVENTS

(75) Inventors: Daniel J. Martin, Pawling, NY (US); Matthew E. Duggan, Chertsey (GB); Christopher J. Baggott, London (GB)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/535,873

(22) Filed: Aug. 5, 2009

(65) Prior Publication Data

US 2011/0035628 A1  Feb. 10, 2011

(51) Int. Cl.
  *G06F 11/00* (2006.01)
(52) U.S. Cl.
  USPC .......................................................... 714/33
(58) Field of Classification Search
  USPC ........................................ 714/26, 37, 32, 33
  See application file for complete search history.

(56) References Cited

U.S. PATENT DOCUMENTS

| 5,949,759 | A  | * | 9/1999  | Cretegny et al. ............. 370/250 |
| 7,103,807 | B2 |   | 9/2006  | Bosa |
| 7,426,654 | B2 | * | 9/2008  | Adams et al. ................. 714/4.3 |
| 2002/0069199 | A1 | * | 6/2002  | Kang ............................... 707/9 |
| 2005/0172306 | A1 | * | 8/2005  | Agarwal et al. .............. 719/328 |
| 2005/0235057 | A1 | * | 10/2005 | Brodie et al. ................. 709/224 |
| 2005/0249119 | A1 |   | 11/2005 | Elie-Dit-Cosaque et al. |
| 2006/0036906 | A1 | * | 2/2006  | Luciani et al. ................. 714/11 |
| 2007/0115837 | A1 |   | 5/2007  | Elie-Dit-Cosaque et al. |
| 2007/0140126 | A1 |   | 6/2007  | Osswald et al. |
| 2010/0100775 | A1 | * | 4/2010  | Slutsman et al. ............... 714/47 |
| 2010/0161752 | A1 | * | 6/2010  | Collet et al. .................. 709/216 |
| 2011/0276396 | A1 | * | 11/2011 | Rathod ....................... 705/14.49 |

OTHER PUBLICATIONS

Finn, "Connectivity Fault Management," Cisco Systems, IEEE 802.1 Tutorial, Portland, Jul. 12, 2004 http://ieee802.org/802_tutorials/july04/nfinn-cfm-tutorial-1.pdf.

(Continued)

*Primary Examiner* — Yair Leibovich
(74) *Attorney, Agent, or Firm* — Terrile, Cannatti, Chambers & Holland, LLP; Stephen A. Terrile

(57) ABSTRACT

A method, system and computer-usable medium are disclosed for suppressing managed endpoint (MEP) child events in a network. A MEP multicast message is broadcast by an originating MEP. Responses received from peer MEPs within a selected time interval are processed to determine their respective IP address, MAC address, and VLAN. If this information is not currently stored in a table of peer MEP device information associated with the originating MEP, then it is added. The responding MEP is then marked in the peer MEP device table as having responded. Peer MEP devices that have responded to previous multicast messages, but have now failed to respond within the selected time interval, are determined. A MEP network event is generated, comprising the IP address of the device containing the MEP, the MAC address for inward-facing MEPs, the MAC address of the associated bridge, the port addresses for outward-facing MEPs, and associated VLAN information. If another MEP network event occurs, the MAC address of the MEP and its VLAN information is determined. If the VLAN associated with the current MEP network event contains a MAC address associated with a prior MEP network event, then the MEP network event is designated as a child MEP network event and suppressed. Otherwise, the MEP network event is designated as a parent MEP network.

20 Claims, 5 Drawing Sheets

(56) References Cited

OTHER PUBLICATIONS

Nortel Metro Ethernet Routing Switch 8600: Troubleshooting, Nortel Networks, pp. 1-308, Aug. 2007 http://www142.nortelnetworks.com/techdocs/MERS8600_4_2/pdf/NN46220-701_01.01_TRBL.pdf.

* cited by examiner

SYSTEM AND METHOD FOR CORRELATING CARRIER ETHERNET CONNECTIVITY FAULT MANAGEMENT EVENTS

BACKGROUND OF THE INVENTION

1. Field of the Invention

Embodiments of the disclosure relate in general to the field of computers and similar technologies, and in particular to software utilized in this field. Still more particularly, it relates to a method, system and computer-usable medium for the suppression of managed endpoint (MEP) child events in a network.

2. Description of the Related Art

The demand for greater network bandwidth and availability by consumers, businesses, and government continues to grow. As a result, there has been a corresponding increase in the speed, size, and connectivity of today's networks, many of which are based on variants of the Ethernet protocol. At the same time, there has been a growing awareness by network managers of the need for additional security mechanisms and more flexibility and control when configuring their networks. One approach to these issues is the implementation of a virtual local area networks (VLAN), which has the same attributes as a physical LAN, but allows the reconfiguration of a network through software instead of physically relocating devices. Another advantage of a VLAN is that it also enables groupings of end points even if they are not located on the same network switch.

However, the benefits of a VLAN are often offset by various challenges in their effective management. One such challenge is the management of connectivity faults, referred to within the Ethernet protocol as connectivity fault management. In the Ethernet P802.1ag standard, each maintenance endpoint (MEP) sends out a multicast packet to each other maintenance endpoint defined within its VLAN. If the originating MEP does not receive a response packet from a peer MEP within a predetermined time interval, it may generate an asynchronous event report, commonly referred to as a trap. For VLANs that are large (e.g., 100 MEPs), the failure of a single MEP will result in a correspondingly large number of traps being sent by the other MEPs in the VLAN. For example, a failure occurring at a single MEP within a 100 MEP VLAN results in the receipt of 99 traps due to each of the other MEPs generating a trap when they did not receive a response packet from the failed endpoint within the predetermined time interval.

This large number of sympathetic traps, or child events, could create an event storm, especially in the case of an event occurring on a switch that terminates a large number of separate VLANs. Determining which of these network events is associated with a root cause of a network issue can prove problematic. In view of the foregoing there is a need to suppress child events generated as a result of the occurrence of an originating event on a MEP. However, there is no current solution for suppressing such child events in order to identify the parent MEP event.

BRIEF SUMMARY OF THE INVENTION

The present invention includes, but is not limited to, a method, system and computer-usable medium for suppressing managed endpoint (MEP) child events in a network. In various embodiments, a MEP event management module is implemented to determine which MEP network events are sympathetic, or children, and which ones are parents. In these and other embodiments, a time interval is selected for a receiving MEP device to respond to a MEP multicast message broadcast by an originating peer MEP device. In one embodiment, the multicast message comprises a multicast continuity check message. Each of the responses to the multicast message received within the selected time interval are then processed to determine their respective Internet Protocol (IP) address, the Media Access Connectivity (MAC) address, and Virtual Local Area Network (VLAN) information. If the information is not currently stored in a table of peer MEP device information associated with the MEP that broadcast the multicast message, then it is added. The responding MEP is then marked in the peer MEP device table as having responded.

In various embodiments, information stored in a repository of MEP device and peer MEP device data is processed to determine peer MEP devices that have responded to previous multicast messages, but have now failed to respond within the time interval selected. Information related to peer MEP devices not responding to the multicast message is then processed to determine their respective IP address, MAC address, and VLAN information. A MEP network event is generated, comprising the IP address of the device containing the MEP, the MAC address for inward-facing MEPs, the MAC address of the associated bridge, the port addresses for outward-facing MEPs, and associated VLAN information. A database of peer MEP tables is then queried to determine the IP address of the MEP device that originated the multicast message, which is then added to the network event.

If another MEP network event occurs, the MAC address of the MEP associated with the MEP network event, along with its VLAN information, is determined. A repository of MEP network event data is queried to determine MAC addresses and VLAN information of MEPs associated with prior MEP network events. If the VLAN associated with the current MEP network event contains a MAC address associated with a prior MEP network event, then the MEP network event is designated as a child MEP network event. The child MEP network event is then suppressed. Otherwise, the MEP network event is designated as a parent MEP network event. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
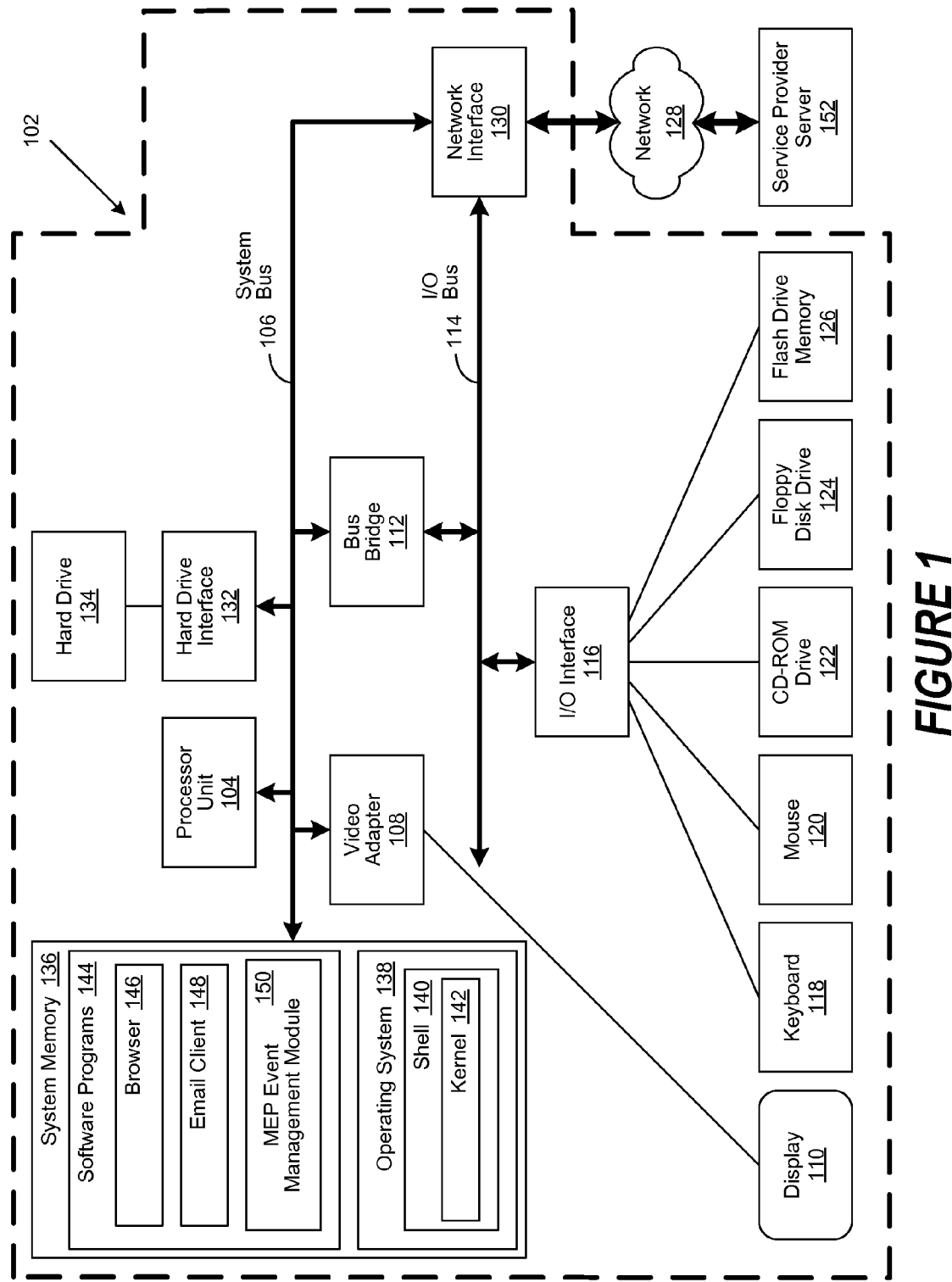
FIG. 1 depicts an exemplary client computer in which the present invention may be implemented.

A method, system and computer-usable medium are disclosed for suppressing managed endpoint (MEP) child events in a network. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a managed endpoint (MEP) management module 150. The MEP event management module 150 includes code for implementing the processes described in FIGS. 2 through 3 described hereinbelow. In one embodiment, client computer 102 is able to download the MEP event management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
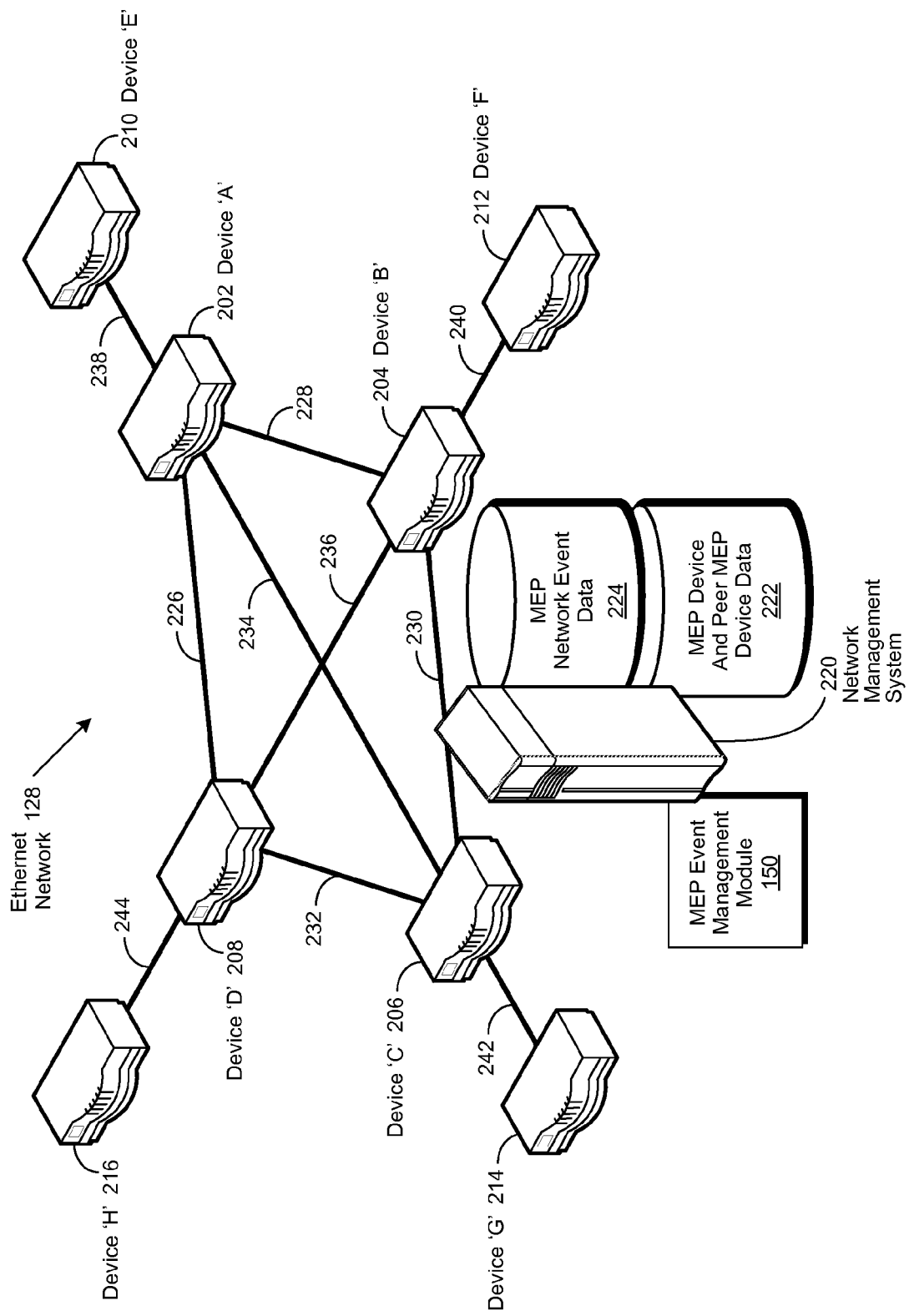
FIG. 2 shows a simplified block diagram of a managed endpoint (MEP) event management module as implemented in an embodiment of the invention.

FIG. 2 is a simplified block diagram of a managed endpoint (MEP) event management module as implemented in an embodiment of the invention. In this embodiment, Ethernet network 128 comprises a network implemented with one or more variants of the Ethernet protocol. Ethernet network 128 further comprises a network management system 220, further comprising a MEP event management module 150, a repository of MEP device and peer MEP device data, and a repository of MEP network event data 224. The Ethernet network 128 further comprises MEP devices 'A' 202, 'B' 204, 'C' 206, and 'D' 208 interconnected by circuits 226, 228, 230, 232, 234, and 236. The Ethernet network 128 further comprises MEP device 'E', connected to MEP device 'A' via circuit 238, MEP device 'F', connected to MEP device 'B' via circuit 240, MEP device 'G', connected to MEP device 'C' via circuit 206, and MEP device 'H', connected to MEP device 'D' via circuit 244.

Knowledgeable practitioners of the art are aware that a failure MEP in an Ethernet network 128 may cause multiple sympathetic MEP network events. As an example, a Virtual Local Area Network (VLAN) may be defined to include ports on MEP devices 'E' 210, 'F' 212, 'G' 214, and 'H' 216. If a fault occurs on MEP device 'A' 202, then MEP network events, or traps, are generated by MEP devices 'B' 204, 'C' 206, and 'D' 208, as they are no longer able to reach ports on MEP device 'E' 210. However, the fault in the Ethernet network 128 is not with MEP devices 'B' 204, 'C' 206, and 'D' 208. Instead, it is with MEP device 'A' 202. The MEP network faults generated by MEP devices 'B' 204, 'C' 206, and 'D' 208 are sympathetic, or children, MEP network events. It will be apparent to those of skill in the art that the generation these sympathetic, or child, MEP events in Ethernet networks 128 that comprise large numbers of MEPs (e.g., 100 MEPS) could result in what is often referred to as an "event storm." Such event storms create additional challenges when isolating the root cause of a MEP network event. Accordingly, it is advantageous to suppress such child MEP network events.

In various embodiments, a MEP event management module 150 is implemented to determine which MEP network events are parents and which ones or children. In these and other embodiments, a time interval is selected for a receiving MEP device to respond to a MEP multicast message broadcast by an originating peer MEP device. In these embodiments, both the originating and receiving MEP devices may be MEP device 'A' 202, 'B' 204, 'C' 206, 'D' 208, 'E' 210, 'F' 212, 'G' 214, or 'H' 216. In one embodiment, the time interval is user-selectable. A MEP device 'A' 202, 'B' 204, 'C' 206, 'D' 208, 'E' 210, 'F' 212, 'G' 214, or 'H' 216 within a management domain is then selected to broadcast the multiplex message. In one embodiment, the multicast message comprises a multicast continuity check message.

Each of the responses to the multicast message received within the selected time interval are then processed to determine their respective Internet Protocol (IP) address, the Media Access Connectivity (MAC) address, and Virtual Local Area Network (VLAN) information. A determination is made whether the IP address, MAC address, and VLAN information is currently stored in a table of peer MEP device information associated with the MEP that broadcast the multicast message. If not, then the IP address, MAC address, and VLAN information is entered into the table of peer MEP device information associated with the MEP that broadcast the multicast message. However, if the information associated with the responding MEP is currently in the peer MEP device table, or once it is added, then the responding MEP is marked in the peer MEP device table as having responded. In one embodiment, information associated with peer MEPs in the VLAN associated with the originating MEP are stored in a repository of MEP device and peer MEP device data 222.

In various embodiments, the information stored in the repository of MEP device and peer MEP device data is processed by the MEP event management module 150 to determine peer MEP devices that have responded to previous multicast messages, but have now failed to respond within the time interval selected. Information related to peer MEP devices not responding to the multicast message is then processed to determine their respective IP address, MAC address, and VLAN information. Then a MEP network event is generated, comprising the IP address of the device containing the MEP, the MAC address for inward-facing MEPs, the MAC address of the associated bridge, the port addresses for outward-facing MEPs, and associated VLAN information. A database of peer MEP tables is then queried to determine the IP address of the MEP device that originated the multicast message, which is then added to the network event.

If another MEP network event occurs, the MAC address of the MEP associated with the MEP network event, along with its VLAN information, is determined. A repository of MEP network event data 224 is queried to determine MAC addresses and VLAN information of MEPs associated with prior MEP network events. If the VLAN associated with the current MEP network event contains a MAC address associated with a prior MEP network event, then the MEP network event is designated as a child MEP network event. The child MEP network event is then suppressed. Otherwise, the MEP network event is designated as a parent MEP network.

Figure 3A:
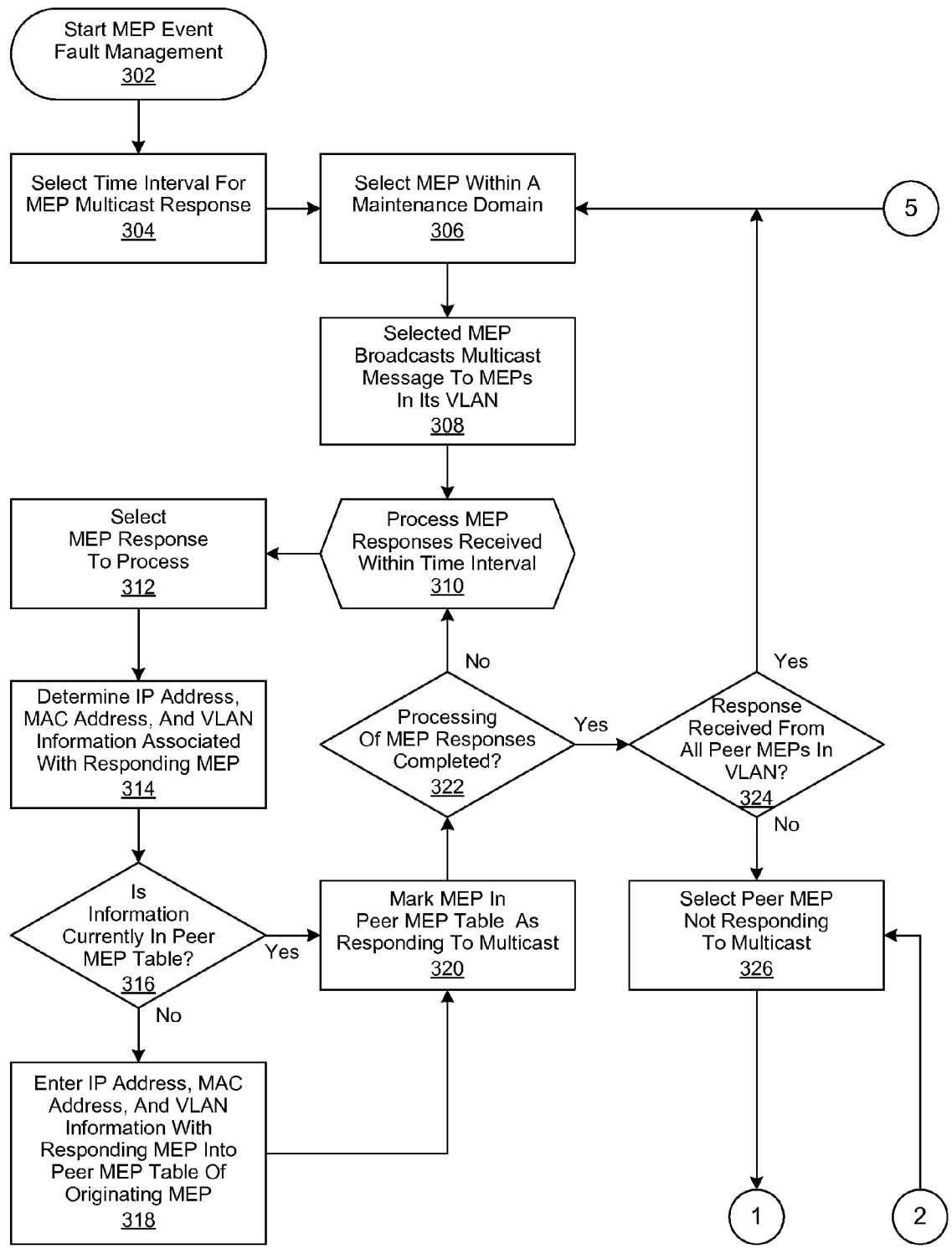
FIGS. 3a-c are a flow chart of the operation of a MEP event management module as implemented for the suppression of child MEP events in a network.
Figure 3B:
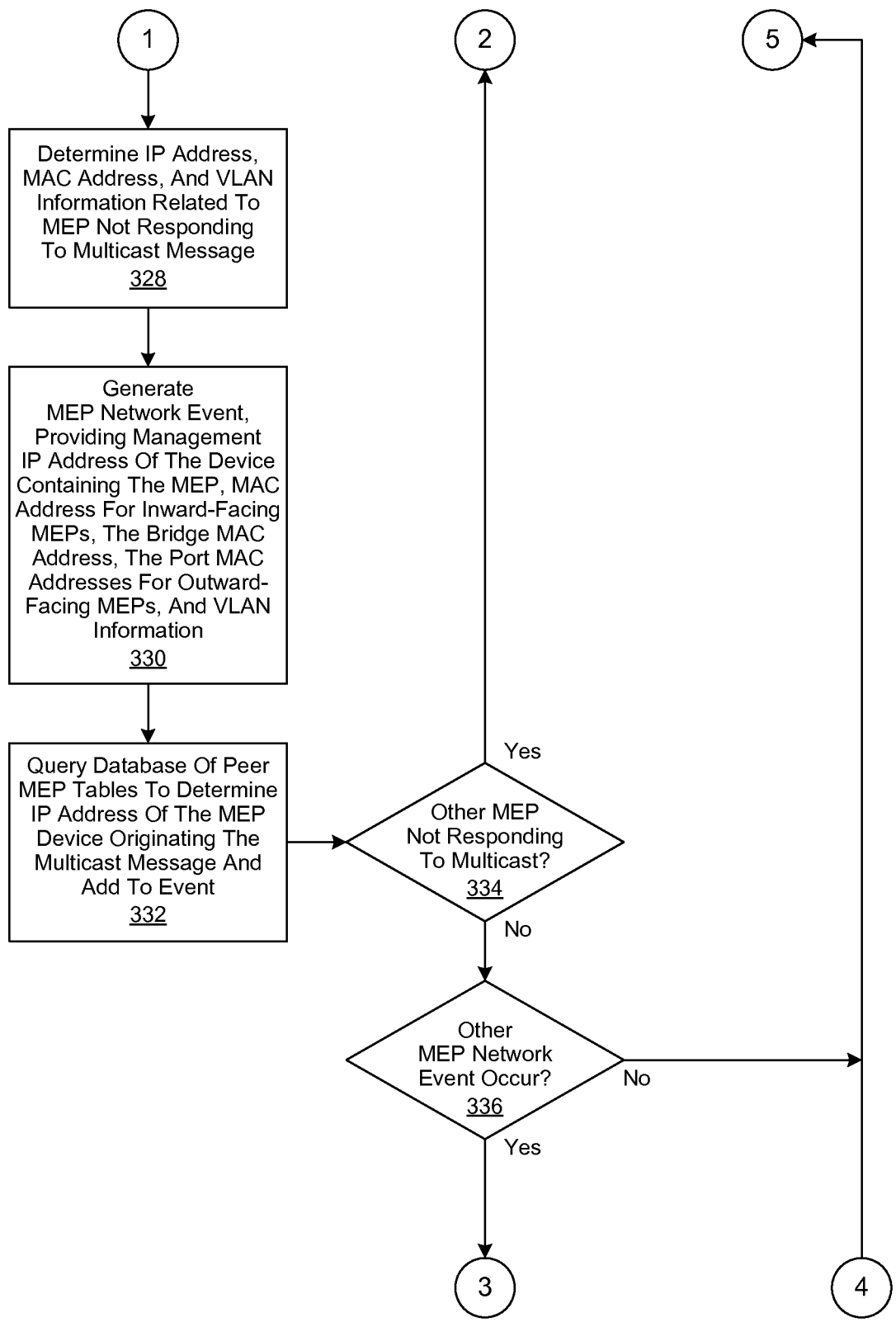
Figure 3C:
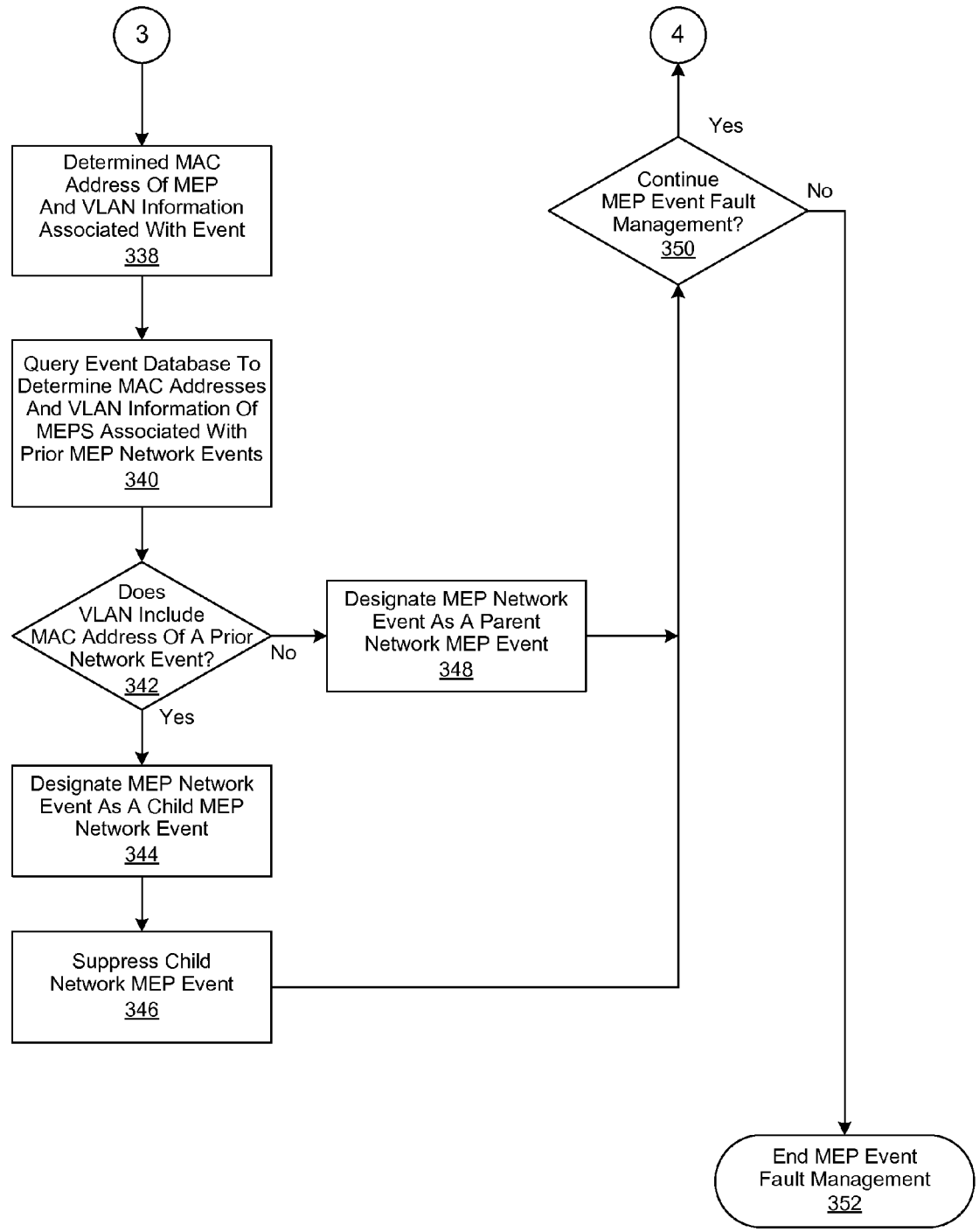

FIGS. 3a-c are a flow chart of the operation of a managed endpoint (MEP) event management module as implemented for the suppression of child MEP events in a network. In this embodiment, MEP event fault management operations are begun in step 302, followed by the selection in step 304 of a time interval for a receiving MEP to respond to a MEP multicast message broadcast by an originating MEP. In one embodiment, the time interval is user-selectable. In step 306, a MEP is selected within a management domain, followed by the selected MEP broadcasting a multicast message to other MEPs within its virtual local area network (VLAN) in step 308. In one embodiment, the multicast message comprises a multicast continuity check message.

Responses to the multicast message received within the time interval selected in step 304 are then processed in step 310. A MEP response is selected in step 312 to process, followed by determining the Internet Protocol (IP) address, the Media Access Connectivity (MAC) address, and Virtual Local Area Network (VLAN) information associated with the responding MEP in step 314. A determination is then made in step 316 whether the IP address, MAC address, and VLAN information is currently stored in a table of peer MEP device information associated with the MEP that broadcast the multicast message. If not, then the IP address, MAC address, and VLAN information is entered into the table of peer MEP device information associated with the MEP that broadcast the multicast message in step 318. If it is determined in step 316 that the information associated with the responding MEP is currently in the peer MEP device table, or if has been added in step 318, then the responding MEP is marked in the peer MEP device table as having responded.

A determination is then made in step 322 whether all MEP responses to the multicast message have been processed. If not, then the process continues, proceeding with step 310. Otherwise, a determination is made in step 324 whether responses have been received from all peer MEPs in the VLAN associated with the originating MEP. In one embodiment, information associated with peer MEPs in the VLAN associated with the originating MEP are stored in a repository of MEP device and peer MEP device data. In this embodiment, the information stored in the repository of MEP device and peer MEP device data is processed to determine peer MEP devices that have responded to previous multicast messages, but have now failed to respond within the time interval selected in step 304.

If it is determined in step 324 that a response has been received by all MEPs in the VLAN associated with the originating MEP, then the process is continued, proceeding with step 304. Otherwise, a peer MEP not responding to the multicast message is selected in step 326. In step 328, the IP address, the MAC address, and VLAN information related to the MEP not responding to the multicast message is determined. Then a network event is generated in step 330, comprising the IP address of the device containing the MEP, the MAC address for inward-facing MEPs, the MAC address of the associated bridge, the port addresses for outward-facing MEPs, and associated VLAN information. A database of peer MEP tables is then queried to determine the IP address of the MEP device that originated the multicast message, which is then added to the network event in step 332.

A determination is then made in step 334 if there are other MEPs not responding to the multicast message. If so, the process continues, proceeding with step 326. Otherwise, a determination is made in step 336 whether there has been an occurrence of another MEP network event. If not, the process is continued, proceeding with step 306. Otherwise, the MAC address of the MEP associated with the MEP network event, along with its VLAN information, is determined in step 338. A repository of MEP network event data is queried in step 340 to determine MAC addresses and VLAN information of MEPs associated with prior MEP network events. A determination is then made in step 342 whether the VLAN associated with the current MEP network event contains a MAC address associated with a prior MEP network event. If so, then the MEP network event is designated as a child MEP network event in step 344 and it is suppressed in step 346. It will be apparent to skilled practitioners of the art that if the child network events were not suppressed, then an "event storm" could occur, making it difficult to determine the originating parent network event. Otherwise, the MEP network event is designated as a parent MEP network event in step 348. Once the MEP network event is respectively designated as a child or parent MEP network event in step 346 or step 348, a determination is made in step 350 whether to continue MEP event fault management operations. If so, the process is continued, proceeding with step 306. Otherwise, MEP event fault management operations are ended in step 352.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing network connectivity faults, comprising:
   generating a first set of network device identifying information related to a first receiving managed endpoint (MEP) failing to respond to a multicast message broadcast by an originating MEP within a predetermined and selectable period of time;
   processing the first set of network information to generate a first set of MEP network event information, including related addresses;
   generating subsequent sets of network device identifying information related to other receiving managed endpoints (MEPs) failing to respond to the multicast message within the selectable predetermined period of time;
processing the subsequent sets of network information to generate additional sets of MEP network event information, including related addresses;
performing comparison operations between the sets of MEP network event information to determine if an MEP network event is a child of said first MEP network event, the child of said first MEP network event being a sympathetic event of said first MEP network event by determining whether the first and other sets of MEP network event information are stored within a peer MEP device information repository;
storing the sets of MEP network event information within the peer MEP device information repository when the sets of MEP network event information are not stored within the peer MEP device information repository; and
avoiding an event storm by suppressing all sympathetic events.

2. The method of claim 1, wherein the first and second MEP network events occur in a network using the Ethernet protocol.

3. The method of claim 1, wherein the multicast message comprises a multicast continuity check message.

4. The method of claim 1, wherein the first and second sets of network device information are stored in a repository of MEP device and peer MEP device data.

5. The method of claim 1, wherein the first and second sets of network event information are stored in a repository of MEP network event data.

6. The method of claim 1, wherein the predetermined period of time is selectable by a user.

7. A system comprising:
a processor;
a data bus coupled to the processor; and
a computer-usable medium embodying computer program code, the computer-usable medium being coupled to the data bus, the computer program code managing network connectivity faults and comprising instructions executable by the processor and configured for:
generating a first set of network device identifying information related to a first receiving managed endpoint (MEP) failing to respond to a multicast message broadcast by an originating MEP within a predetermined and selectable period of time;
processing the first set of network information to generate a first set of MEP network event information, including related addresses;
generating subsequent sets of network device identifying information related to other receiving managed endpoints (MEPs) failing to respond to the multicast message within the selectable predetermined period of time;
processing the subsequent sets of network information to generate additional sets of MEP network event information, including related addresses;
performing comparison operations between the sets of MEP network event information to determine if an MEP network event is a child of said first MEP network event, the child of said first MEP network event being a sympathetic event of said first MEP network event by determining whether the first and other sets of MEP network event information are stored within a peer MEP device information repository;
storing the sets of MEP network event information within the peer MEP device information repository when the sets of MEP network event information are not stored within the peer MEP device information repository; and
avoiding an event storm by suppressing all sympathetic events.

8. The system of claim 7, wherein the first and second MEP network events occur in a network using the Ethernet protocol.

9. The system of claim 7, wherein the multicast message comprises a multicast continuity check message.

10. The system of claim 7, wherein the first and second sets of network device information are stored in a repository of MEP device and peer MEP device data.

11. The system of claim 7, wherein the first and second sets of network event information are stored in a repository of MEP network event data.

12. The system of claim 7, wherein the predetermined period of time is selectable by a user.

13. A non-transitory computer-usable medium embodying computer program code, the computer program code comprising computer executable instructions configured for:
generating a first set of network device identifying information related to a first receiving managed endpoint (MEP) failing to respond to a multicast message broadcast by an originating MEP within a predetermined and selectable period of time;
processing the first set of network information to generate a first set of MEP network event information, including related addresses;
generating subsequent sets of network device identifying information related to other receiving managed endpoints (MEPs) failing to respond to the multicast message within the selectable predetermined period of time;
processing the subsequent sets of network information to generate additional sets of MEP network event information, including related addresses;
performing comparison operations between the sets of MEP network event information to determine if an MEP network event is a child of said first MEP network event, the child of said first MEP network event being a sympathetic event of said first MEP network event by determining whether the first and other sets of MEP network event information are stored within a peer MEP device information repository; and
storing the sets of MEP network event information within the peer MEP device information repository when the sets of MEP network event information are not stored within the peer MEP device information repository; and
avoiding an event storm by suppressing all sympathetic events.

14. The computer usable medium of claim 13, wherein the first and second MEP network events occur in a network using the Ethernet protocol.

15. The computer usable medium of claim 13, wherein the multicast message comprises a multicast continuity check message.

16. The computer usable medium of claim 13, wherein the first and second sets of network device information are stored in a repository of MEP device and peer MEP device data.

17. The computer usable medium of claim 13, wherein the first and second sets of network event information are stored in a repository of MEP network event data.

18. The computer usable medium of claim 13, wherein the predetermined period of time is selectable by a user.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *